(12) United States Patent
Spiegelman et al.

(10) Patent No.: US 12,248,372 B2
(45) Date of Patent: Mar. 11, 2025

(54) TRANSPARENT RECOVERY OF EMULATED STORAGE DEVICE AFTER A FAILURE

(71) Applicant: MELLANOX TECHNOLOGIES, LTD., Yokneam (IL)

(72) Inventors: Roman Spiegelman, Yokneam Illit (IL); Eliav Bar-Ilan, Or Akiva (IL); Oren Duer, Kohav Yair (IL)

(73) Assignee: Mellanox Technologies, Ltd., Yokneam (IL)

( * ) Notice: Subject to any disclaimer, the term of this patent is extended or adjusted under 35 U.S.C. 154(b) by 171 days.

(21) Appl. No.: 18/186,171

(22) Filed: Mar. 19, 2023

(65) Prior Publication Data

US 2024/0311250 A1    Sep. 19, 2024

(51) Int. Cl.
G06F 11/00    (2006.01)
G06F 11/14    (2006.01)

(52) U.S. Cl.
CPC .... G06F 11/1435 (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 6,148,377 A | 11/2000 | Carter et al. | |
| 6,571,288 B1 | 5/2003 | Sarukkai | |
| 6,591,355 B2 | 7/2003 | Schuster et al. | |
| 6,823,429 B1 | 11/2004 | Olnowich | |
| 7,162,476 B1 | 1/2007 | Belair et al. | |
| 8,082,400 B1 | 12/2011 | Chang et al. | |
| 8,266,238 B2 | 9/2012 | Zimmer et al. | |
| 8,341,626 B1 | 12/2012 | Gardner et al. | |
| 8,352,940 B2 | 1/2013 | Pafumi et al. | |
| 8,370,302 B2 | 2/2013 | Otani | |
| 8,544,004 B2 | 9/2013 | Fultheim et al. | |

(Continued)

FOREIGN PATENT DOCUMENTS

CA    2632935 A1    7/2007

OTHER PUBLICATIONS

Google Scholar/Patents search—text refined (Year: 2024).*
Mitzenmacher et al., "The Power of Two Random Choices: Survey of Techniques and Results", Handbook of Randomized Computing, pp. 255-312, year 2000.

(Continued)

*Primary Examiner* — Christopher S McCarthy
(74) *Attorney, Agent, or Firm* — Meitar Patents Ltd.; Daniel Kligler

(57) ABSTRACT

In one embodiment, a system includes a storage device controller including a first controller to read commands from a submission queue stored in a shared memory, provide the commands to a second controller, and write completion notices received from the second controller to a completion queue in the shared memory, and the second controller to receive the commands from the first controller, perform storage operations with a non-volatile memory responsively to receiving the commands, generate the completion notices responsively to performing the storage operations, provide the completion notices to the first controller, write recovery data about the commands and the completion notices to a persistent memory, and recover from a failure responsively to retrieving the recovery data from the persistent memory.

19 Claims, 12 Drawing Sheets

(56) References Cited

U.S. PATENT DOCUMENTS

| | | |
|---|---|---|
| 9,342,346 B2 | 5/2016 | Maislos et al. |
| 9,524,328 B2 | 12/2016 | Horowitz et al. |
| 2004/0010487 A1 | 1/2004 | Prahlad et al. |
| 2007/0250838 A1 | 10/2007 | Belady et al. |
| 2008/0059556 A1 | 3/2008 | Greenspan et al. |
| 2008/0109621 A1* | 5/2008 | Burr .................. G06F 11/2071 711/E12.103 |
| 2009/0204718 A1 | 8/2009 | Lawton et al. |
| 2011/0072234 A1 | 3/2011 | Chinya et al. |
| 2011/0078112 A1 | 3/2011 | Takata et al. |
| 2011/0099318 A1 | 4/2011 | Hudzia et al. |
| 2011/0131568 A1 | 6/2011 | Heim |
| 2012/0005556 A1 | 1/2012 | Chang et al. |
| 2012/0011504 A1 | 1/2012 | Ahmad et al. |
| 2012/0284408 A1 | 11/2012 | Dutta et al. |
| 2013/0031559 A1 | 1/2013 | Alicherry |
| 2013/0086235 A1 | 4/2013 | Ferris |
| 2013/0249925 A1 | 9/2013 | Ginzburg |
| 2014/0196037 A1 | 7/2014 | Gopalan |
| 2014/0297979 A1 | 10/2014 | Baron et al. |
| 2015/0234669 A1 | 8/2015 | Ben-Yehuda et al. |
| 2015/0286493 A1 | 10/2015 | Dafni et al. |
| 2015/0288758 A1 | 10/2015 | Zivan |
| 2015/0312366 A1 | 10/2015 | Ben-Yehuda et al. |
| 2015/0378830 A1 | 12/2015 | Hoobler, III et al. |
| 2016/0080148 A1* | 3/2016 | Kawarasaki ............ G06F 21/62 713/193 |
| 2016/0098302 A1 | 4/2016 | Ben-Yehuda et al. |

OTHER PUBLICATIONS

Hudzia et al., "Memory Aggregation for KVM", KVM forum, pp. 1-41, Nov. 2012.

VMware, Inc., "VMware Virtualization," pp. 1-8, year 2014.

Clark et al., "Live Migration of Virtual Machines", Proceedings of the 2nd conference on Symposium on Networked Systems Design & Implementation, vol. 2, USENIX Association, pp. 273-286, May 31, 2005.

Jo et al., "Efficient Live Migration of Virtual Machines Using Shared Storage", ACM Sigplan Notices, vol. 48, No. 7, pp. 41-50, Mar. 31, 2013.

Berral et al., "Power-aware Multi-DataCenter Management using Machine Learning", 42nd International Conference om Parallel Processing, pp. 858-867, year 2013.

Alicherry., "Network Aware Resource Allocation in Distributed Clouds", IEEE Infocom Proceedings, pp. 963-971, year 2012.

Viswanathan et al., "CloadMap: Workload-aware Placement in Private Heterogeneous Clouds", IEEE Network Operations and Management Symposium (NOMS), pp. 9-16, year 2012.

* cited by examiner

TRANSPARENT RECOVERY OF EMULATED STORAGE DEVICE AFTER A FAILURE

FIELD OF THE INVENTION

The present invention relates to computer systems, and in particular, but not exclusively to, recovery from a storage device controller failure.

BACKGROUND

Non-Volatile Memory Express (NVMe) is a storage interface and transfer protocol for Peripheral Component Interconnect Express (PCIe) based solid state drives (SSDs). NVMe allows efficient data storage and boosts data transfer rates. NVMe acts as a storage interface and protocol that works together with a PCIe bus to rapidly read and write large amounts of data.

An NVMe driver in a host device write commands (e.g., new requests) to a submission queue (SQ). A storage device controller reads the commands from the SQ and performs storage related tasks (e.g., reads and/or writes) with a storage device (e.g., SSD). The storage device controller writes completion notifications to a completion queue (CQ). The NVMe driver then reads the completion notifications from the CQ.

The storage device controller may include controller hardware and controller software. The NVMe driver adds a command to the SQ and uses a doorbell mechanism to inform the controller hardware that there is a new command awaiting processing. The controller hardware reads commands from the SQ and provides the commands to the controller software which acts on the commands with respect to the storage device and generates the completion notifications. The controller software provides the completion notifications to the controller hardware which writes the completion notifications to the CQ. The controller hardware also uses a doorbell mechanism to notify the NVMe driver when a completion notification is added to the CQ.

SUMMARY

There is provided in accordance with an embodiment of the present disclosure, a system including a storage device controller, the storage device controller including a first controller to read commands from a submission queue stored in a shared memory, provide the commands to a second controller, and write completion notices received from the second controller to a completion queue in the shared memory, and the second controller to receive the commands from the first controller, perform storage operations with a non-volatile memory responsively to receiving the commands, generate the completion notices responsively to performing the storage operations, provide the completion notices to the first controller, write recovery data about the commands and the completion notices to a persistent memory, and recover from a failure responsively to retrieving the recovery data from the persistent memory.

Further in accordance with an embodiment of the present disclosure the first controller is a hardware controller, and the second controller is a software controller.

Still further in accordance with an embodiment of the present disclosure the controller software is to cause the controller hardware to provide any of the commands already retrieved by the controller hardware but not yet written to the recovery data, and send any of the completion notices included in the recovery data but not yet written to the completion queue.

Additionally in accordance with an embodiment of the present disclosure, the system includes a host device to execute a storage device driver to write the commands to the submission queue, and read the completion notices from the completion queue.

Moreover, in accordance with an embodiment of the present disclosure the submission queue and the completion queue are cyclic queues.

Further in accordance with an embodiment of the present disclosure the controller software is to write copies of the commands to the recovery data, and write copies of the completion notices to the recovery data.

Still further in accordance with an embodiment of the present disclosure the controller software is to write a value to the recovery data based on an index in the submission queue from where a latest command of the commands was provided by the controller hardware, the controller software is to instruct the controller hardware to move a head of the submission queue based on the value stored in the recovery data responsively to the failure, and the controller hardware is to provide at least one missing one of the commands due to the failure responsively to moving the head of the submission queue.

Additionally in accordance with an embodiment of the present disclosure the controller software is to maintain a linked list of ones of the completion notices stored in the recovery data ordered the order in which the completion notices have been provided to the controller hardware, the linked list having a list head and a list tail.

Moreover, in accordance with an embodiment of the present disclosure the controller software is, responsively to completion of a storage operation associated with a given command of the commands, to generate a completion notice, add the generated completion notice to the linked list, connect an entry including the generated completion notice to the linked list as the list tail, and provide the completion notice to the controller hardware.

Further in accordance with an embodiment of the present disclosure the controller software is to generate the completion notices to include respective positions of a head of the submission queue.

Still further in accordance with an embodiment of the present disclosure the controller software is to add to the recovery data respective indices of the completion queue at which respective ones of the completion notices are, or will be, written by the controller hardware to the completion queue.

Additionally in accordance with an embodiment of the present disclosure, in response to the failure, the controller software is to search in the linked list for an index of a current position of a tail of the completion queue, and in response to not finding the index of the current position of the tail in the linked list, determine that all the completion notices were written to the completion queue by the controller hardware.

Moreover, in accordance with an embodiment of the present disclosure, in response to the failure, the controller software is to search in the linked list for an index of a current position of a tail of the completion queue, and in response to finding the index of the current position of the tail in the linked list, provide to the controller hardware the completion notices that are in the linked list, an order of the linked list, starting from an entry of the linked list including the found index.

Further in accordance with an embodiment of the present disclosure in response to the failure, the controller software is to search in the linked list for a given entry E including (1) an index of a current position of a tail of the completion queue, and (2) a submission queue head position equal to a position of the head of the submission queue included in an entry of the completion queue at the current position of the tail of the completion queue, search for at least M−1 entries in the linked list after the given entry E, wherein M is a size of the completion queue, and in response to finding the given entry E and the at least M−1 entries, provide to the controller hardware the completion notices that are in the linked list an order of the linked list starting from an $M^{th}$ entry after the given entry E in the linked list.

Still further in accordance with an embodiment of the present disclosure, in response to the failure, the controller software is to search in the linked list for a given entry E including (1) an index of a current position of a tail of the completion queue, and (2) a submission queue head position equal to a position of the head of the submission queue included in an entry of the completion queue at the current position of the tail of the completion queue, search for at least M−1 entries in the linked list after the given entry E, wherein M is a size of the completion queue, in response to not finding the at least M−1 entries, search in the linked list for a given entry F including the current position of the tail of the completion queue, and in response to finding the given entry F, provide to the controller hardware the completion notices an order of the linked list that are in the linked list starting from the given entry F in the linked list.

Additionally in accordance with an embodiment of the present disclosure, in response to the failure, the controller software is to search in the linked list for a given entry E including (1) an index of a current position of a tail of the completion queue, and (2) a submission queue head position equal to a position of the head of the submission queue included in an entry of the completion queue at the current position of the tail of the completion queue, in response to not finding the given entry E, search in the linked list for a given entry F including the current position of the tail of the completion queue, and in response to finding the given entry F, provide to the controller hardware the completion notices an order of the linked list that are in the linked list starting from the given entry F in the linked list.

Moreover in accordance with an embodiment of the present disclosure the recovery data includes a plurality of entries, some of the entries include respective ones of the commands without corresponding completion notices, some of the entries include respective ones of the commands with corresponding completion notices, and the controller software, responsively to completion of a storage operation associated with a given command of the commands, is to generate a completion notice, add the generated completion notice to a given entry of the entries including the given command, connect the given entry to the linked list as the list tail, and provide the completion notice to the controller hardware.

Further in accordance with an embodiment of the present disclosure the controller software is to add a latest command of the commands received from the controller hardware to one of the entries at the list head of the linked list, and disconnect the entry of the latest command from the linked list.

There is also provided in accordance with another embodiment of the present disclosure a method, including reading commands from a submission queue stored in a shared memory, providing the commands to a first controller, writing completion notices received from the first controller to a completion queue in the shared memory, receiving the commands from a second controller, performing storage operations with a non-volatile memory responsively to receiving the commands, generating the completion notices responsively to performing the storage operations, providing the completion notices to the second controller, writing recovery data about the commands and the completion notices to a persistent memory, and recovering from a failure responsively to retrieving the recovery data from the persistent memory.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
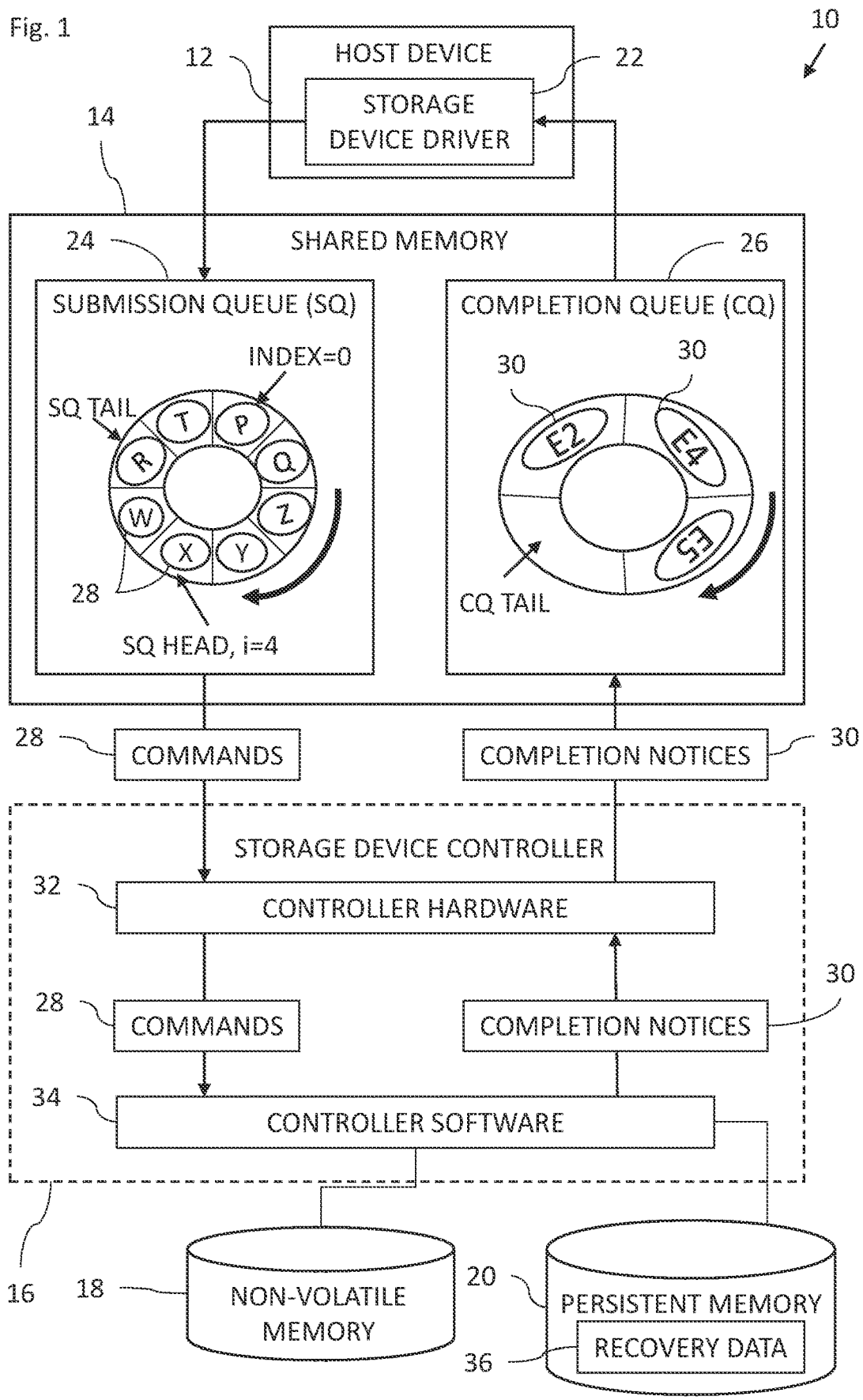
FIG. 1 is a block diagram view of storage device system constructed and operative in accordance with an embodiment of the present invention.

The controller hardware is generally very simple and theoretically should never fail. Failure may occur in a stateless pipe between the controller hardware and the controller software as well as in the controller software itself. Recover from a failure may be difficult while being transparent to the NVMe driver and host device. There may be one or more commands that the host device sent and were lost in the stateless pipe during the failure. There may be one or more commands that were received by the controller software before the failure occurred, but the controller software did not yet perform actions requested by the commands before the failure occurred. Also, there may be one or more completion notices which were not received by the controller hardware and therefore need to be resent to the controller hardware. Recovery is further complicated by the fact that data stored in the CQ is not easily usable to identify lost completion notices to perform recovery. For example, NVMe does not use unique identifiers for completion notices.

Embodiments of the present invention provide a storage controller which writes recovery data to a persistent memory. In the event of a failure, the recovery data is used by controller software to discover lost commands and completion notices. The controller software configures the controller hardware to resend the lost commands. The controller software also sends the lost completion notices to the controller hardware for writing to the CQ.

In some embodiments, the controller software maintains a command recovery index (as part of the recovery data stored in the persistent memory) which is indicative of the position of the head of the SQ from which the latest command was retrieved. In the event of a failure, the controller software retrieves the command recovery index and instructs the controller hardware to move the head of the SQ to a new head position based on the command recovery index so that the controller hardware provides the controller software with all the commands from the new head position thereby recovering all the commands which may have been lost by the controller software or in the stateless pipe.

In some embodiments, the controller software maintains a list of entries including received commands and copies of sent completion notices (as part of the recovery data stored in the persistent memory). Each entry may include a command, or a command with its associated completion notice copy. The entries including the completion notices copies are typically stored as a linked list. The number of entries in the list is generally greater than, or equal to, the size of the SQ.

When a new command is received by the controller software, the controller software replaces an entry at the head of the linked list with the newly received command. When a command is fulfilled, a copy of the associated completion notice (which is sent to the CQ) is added to the entry including that command, and that entry is connected to the tail of the linked list. The entries may also include the index of the CQ to which the completion notice has been, or will be, written to the CQ. The completion notice may also include the position of the head of the SQ, which is used by the NVMe driver to update its record of the SQ head.

In the event of a failure, unfulfilled commands may be identified from the list of entries (without corresponding completion notices). The controller software may then proceed to fulfill those unfulfilled commands.

Identifying lost completion notices is a more difficult task. In some embodiments, the controller software identifies lost completion notices from the current position of the tail of the CQ, data at the current position of the tail of the CQ (e.g., the position of the head of the SQ) as well as data from the linked list (e.g., CQ tail index, SQ head position index) as described in disclosed embodiments.

System Description

Reference is now made to FIG. 1, which is a block diagram view of storage device system 10 constructed and operative in accordance with an embodiment of the present invention. The system 10 includes a host device 12, a shared memory 14, a storage device controller 16, a non-volatile memory 18, and a persistent memory 20.

The host device 12 runs a storage device driver 22 such as an NVMe driver. The shared memory 14 is configured to store a submission queue (SQ) 24, and a completion queue (CQ) 26. The storage device driver 22 is configured to write commands 28 (only some labeled for the sake of simplicity) to the SQ 24 and read completion notices 30 (only some labeled for the sake of simplicity) from the CQ 26. The storage device driver 22 is described in more detail with reference to FIG. 2.

The storage device controller 16 includes controller hardware 32 and controller software 34. The controller hardware 32 is configured to read commands 28 from the SQ 24 and provide the commands 28 to the controller software 34 which is configured to act on the commands 28 and perform a storage operation with the non-volatile memory 18. The controller software 34 is configured to generate the completion notices 30 and provide them to the controller hardware 32 to write to the CQ 26. The controller software 34 is configured to write recovery data 36 to the persistent memory 20 to be used to recover from a failure of the controller software 34 or the connection (e.g., stateless pipe) between the controller hardware 32 and the controller software 34. The controller hardware 32 and the controller software 34 are described in more detail with reference to FIGS. 3-14. In practice, some or all of the functions of the controller hardware 32 may be combined in a single physical component or, alternatively, implemented using multiple physical components. These physical components may comprise hard-wired or programmable devices, or a combination of the two.

Figure 2:
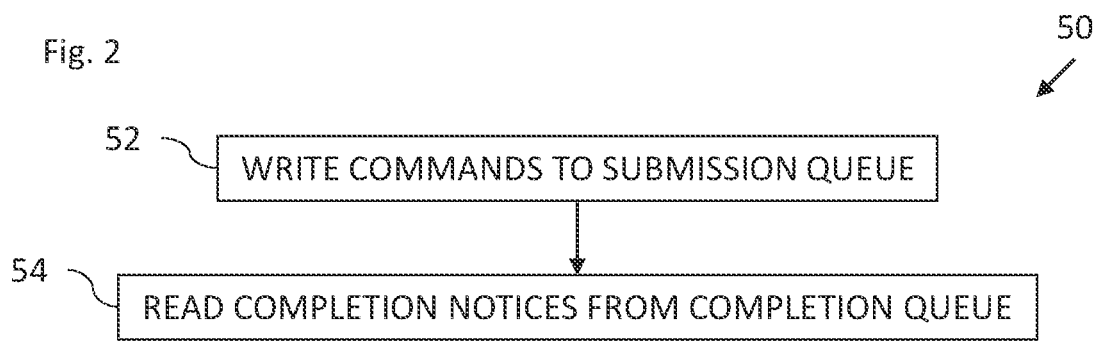
FIG. 2 is a flowchart including steps in a method performed by a driver in the system of FIG. 1.

Reference is now made to FIG. 2, which is a flowchart 50 including steps in a method performed by the storage device driver 22 in the system 10 of FIG. 1. Reference is also made to FIG. 1. The host device 12 is configured to execute the storage device driver 22, which is configured to: write the commands 28 to the SQ 24 (block 52); and read the completion notices 30 from the CQ 26 (block 54). The SQ 24 and the CQ 26 are cyclic queues which are written to, and read from, in a cyclic manner as shown by the arrows in FIG. 1.

Figure 3:
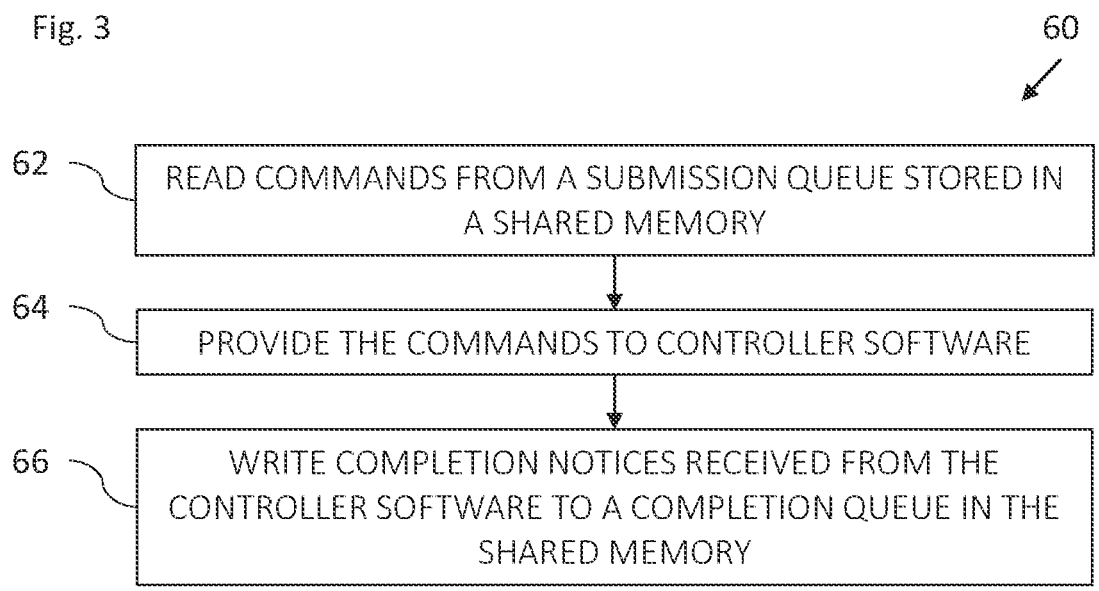
FIG. 3 is a flowchart including steps in a method performed by controller hardware in the system of FIG. 1.

Reference is now made to FIG. 3, which is a flowchart 60 including steps in a method performed by controller hardware 32 in the system 10 of FIG. 1. The controller hardware 32 is configured to: read commands 28 from the SQ 24 stored in the shared memory 14 (block 62); provide the commands 28 to controller software 34 (block 64); and write completion notices 30 received from the controller software 34 to the CQ 26 stored in the shared memory 14 (block 66).

Figure 4:
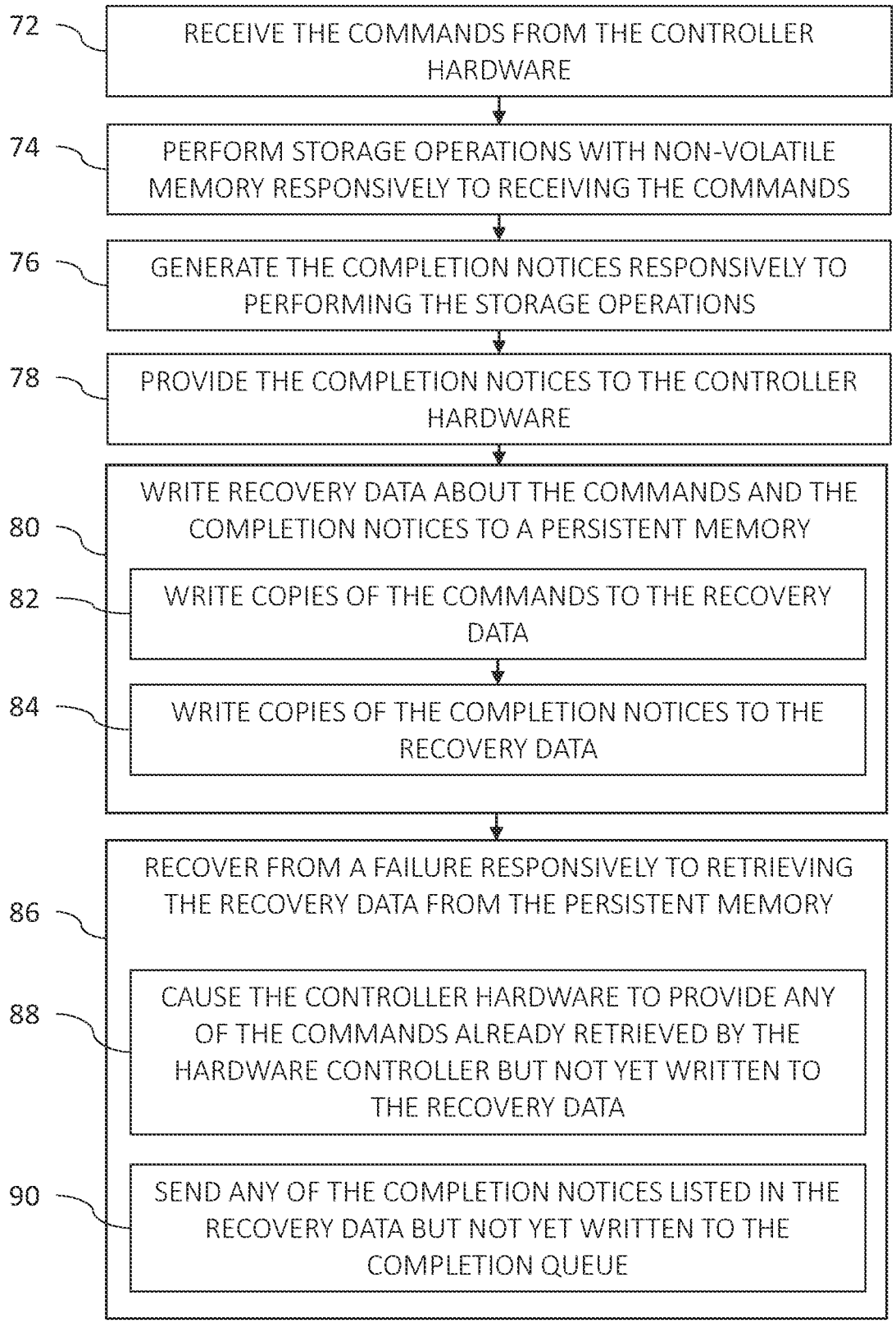
FIG. 4 is a flowchart including steps in a method performed by controller software in the system of FIG. 1.

Reference is now made to FIG. 4, which is a flowchart 70 including steps in a method performed by the controller software 34 in the system 10 of FIG. 1.

The controller software 34 is configured to receive the commands 28 from the controller hardware 32 (block 72); perform storage operations (e.g., reading and/or writing data) with the non-volatile memory 18 responsively to receiving the commands 28 (block 74); generate the completion notices 30 responsively to performing the storage operations (block 76); provide the completion notices 30 to the controller hardware 32 (block 78); and write recovery data 36 about the commands 28 and the completion notices 30 to the persistent memory 20 (block 80). The step of block 80 may include the controller software 34 being configured to write copies of the commands 28 to the recovery data 36 (block 82) and to write copies of the completion notices 30 to the recovery data 36 (block 84). The controller software 34 is configured to: recover from a failure (e.g., software interruption or failure of the stateless pipe) responsively to retrieving the recovery data 36 from the persistent memory 20 (block 86). The step of block 86 may include the controller software 34 being configured to: cause the controller hardware 32 to provide any of the commands 28 already retrieved by the controller hardware 32 but not yet written to the recovery data 36 (block 88); and send any of the completion notices 30 comprised (e.g., listed) in the recovery data 36 but not yet written to the CQ 26 (block 90).

Figure 5:
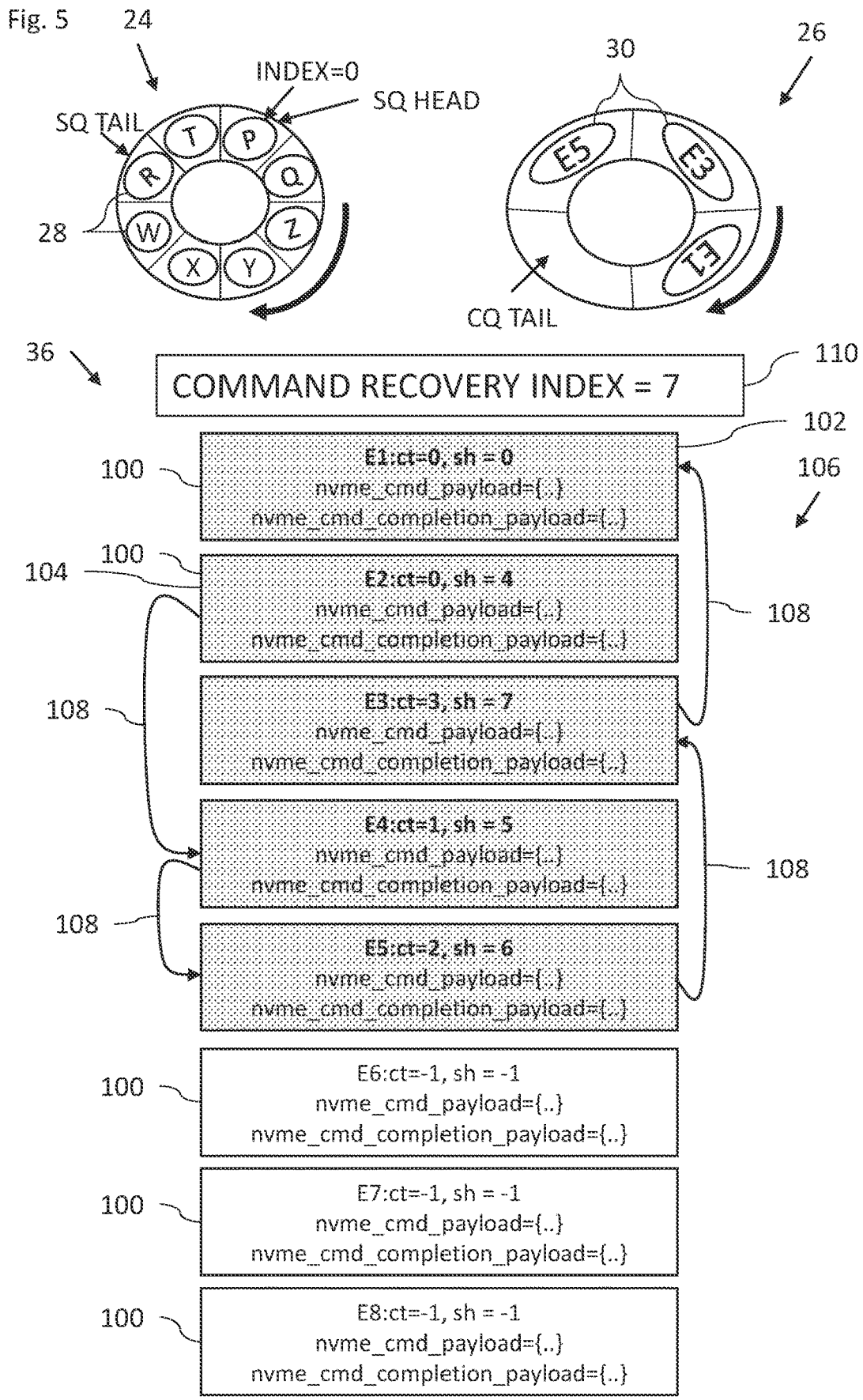
FIG. 5 is a block diagram view of queues and recovery data in the system of FIG. 1.

Reference is now made to FIG. 5, which is a block diagram view of queues 24, 26 and recovery data 36 in the system 10 of FIG. 1. The recovery data 36 includes a plurality of entries 100 (only some labeled for the sake of simplicity). Some of the entries 100 (non-shaded) include respective ones of the commands 28 without corresponding completion notices 30. Some of the entries 100 (shaded) include respective ones of the commands 28 with corresponding completion notices 30. The entries 100 (shaded), including the completion notices 30, form part of a linked list 106 having a list tail 102 and a list head 104. For the sake of illustration, links 108 are shown linking various entries 100 of the linked list 106. The recovery data 36 also includes a command recovery index 110, which is used to recover lost commands 28 and is described in more detail below. The current value of the command recovery index 110 is equal to 7 and corresponds to the index of the SQ 24 from which the latest command 28 was read. FIG. 5 shows that the head of the SQ 24 is at index 0 as the next command 28 will be read from index 0 of the SQ 24 by the controller hardware 32 as described in more detail with reference to FIG. 6.

Each entry 100 includes an identification (e.g., E1, E2, etc.), one command 28, a completion notice 30 (where applicable), a "ct" value, and an "sh" value. The "ct" value is the index of the CQ 26 to which the completion notice 30 in that entry 100 entered, or will enter. If an entry does not have a completion notice 30, the "ct" value may be set to a default value such as −1. The "sh" value is the index of the position of the head of the SQ 24 at the time the completion notice 30 in that entry is generated. The "sh" value informs the storage device driver 22 of the head of the SQ 24. The storage device driver 22 cannot write new commands 28 past the head of the SQ 24 and therefore needs to know the index of the head of the SQ 24. If an entry does not have a completion notice 30, the "sh" value may be set to a default value such as −1.

Figure 6:
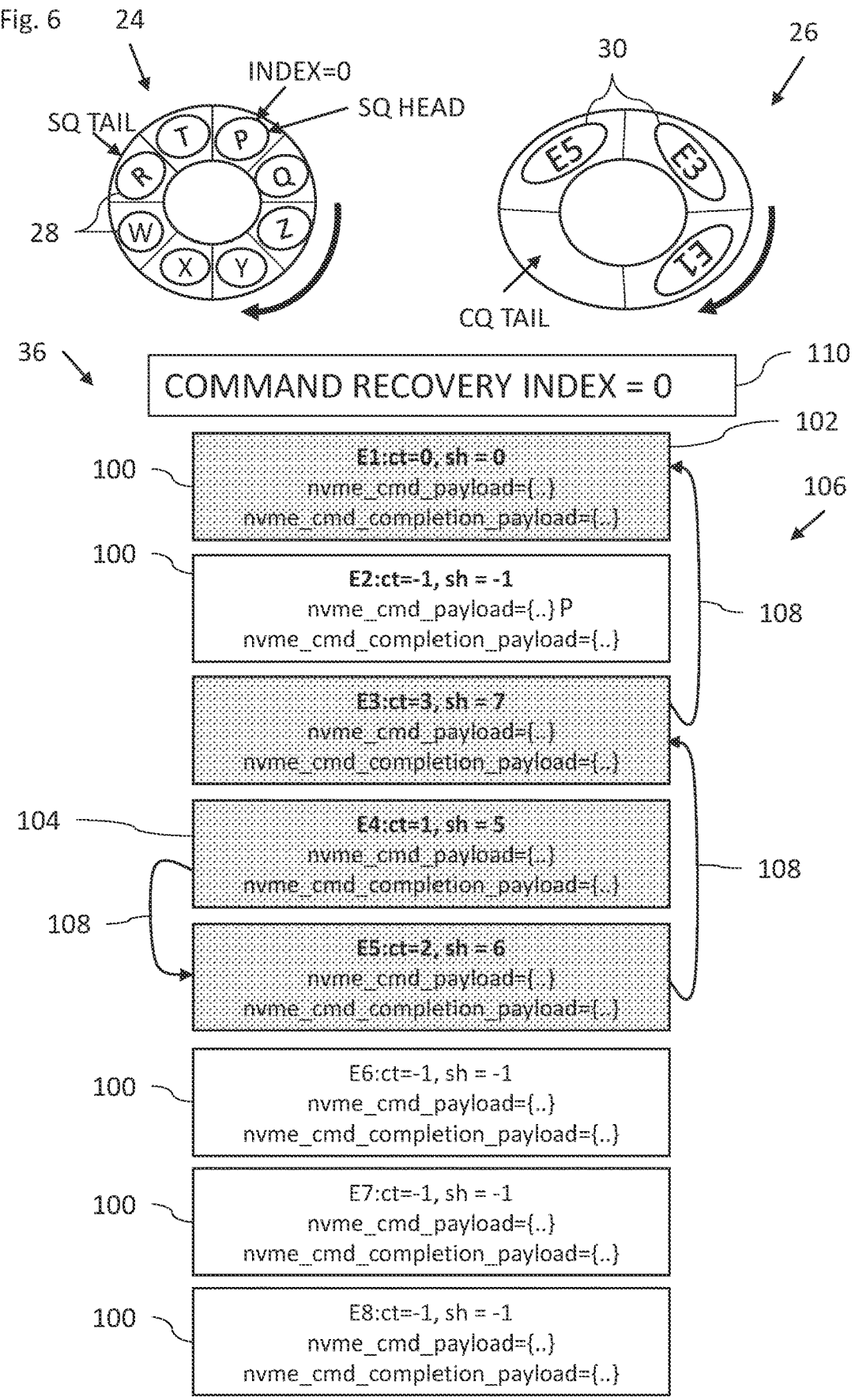
FIG. 6 is a block diagram view of queue and recovery data after receiving a new command in the system of FIG. 1.
Figure 7:
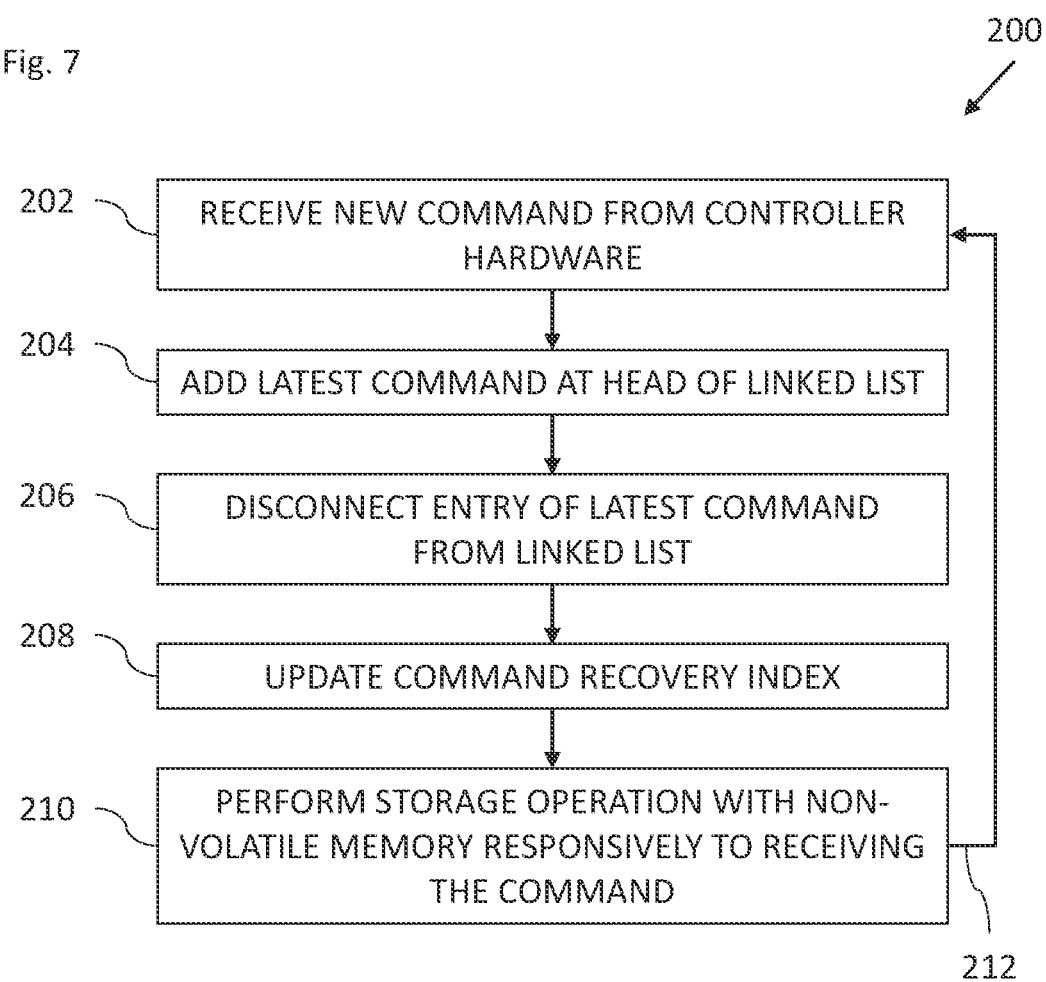
FIG. 7 is a flowchart including steps in a method for receiving a new command in the system of FIG. 1.

Reference is now made to FIGS. 6 and 7. FIG. 6 is a block diagram view of queues 24, 26 and recovery data 36 after receiving a new command in the system 10 of FIG. 1. FIG. 7 is a flowchart 200 including steps in a method for receiving a new command 28 in the system 10 of FIG. 1. The storage device driver 22 adds new commands 28 at the tail of the SQ 24. The controller hardware 32 reads new commands 28 from the head of the SQ 24 and provides the new commands to the controller software 34.

FIG. 6 shows that a new command P at the index 0 of the SQ 24 is read by the controller hardware 32 and provided to the controller software 34. The controller software 34 is configured to receive the new command P (block 202). The controller software 34 is configured to add the new command P to the entry 100 at the head 104 of the linked list 106 and replace the existing entry 100 at the head 104 of the linked list 106 (block 204). It is assumed that the completion notice 30 in the entry at the head 104 of the linked list 106 has already been written to the CQ 26 and therefore that entry can be used for the new command P. The controller software 34 is configured to disconnect the entry including the new command P from the linked list 106 as shown in FIG. 6 (block 206). FIG. 6 now shows that the head 104 of the linked list 106 has moved from entry E2 to entry E4. The controller software 34 is configured to update the command recovery index 110 to 0, because the latest command (i.e., command P) was read from index 0 of the SQ 24 (block 208). In general, the controller software 34 is configured to write a value (i.e., the command recovery index 110) to the recovery data 36 based on the index in the SQ 24 from where the latest command 30 was provided by the controller hardware 32. The value may be equal to the index or may be equal to the index plus one or any suitable value. The controller software 34 is configured to perform a storage operation with the non-volatile memory 18 responsively to receiving the command 30 (block 210). The steps of blocks 202-210 are repeated for each newly received command 28 (arrow 212).

Figure 8:
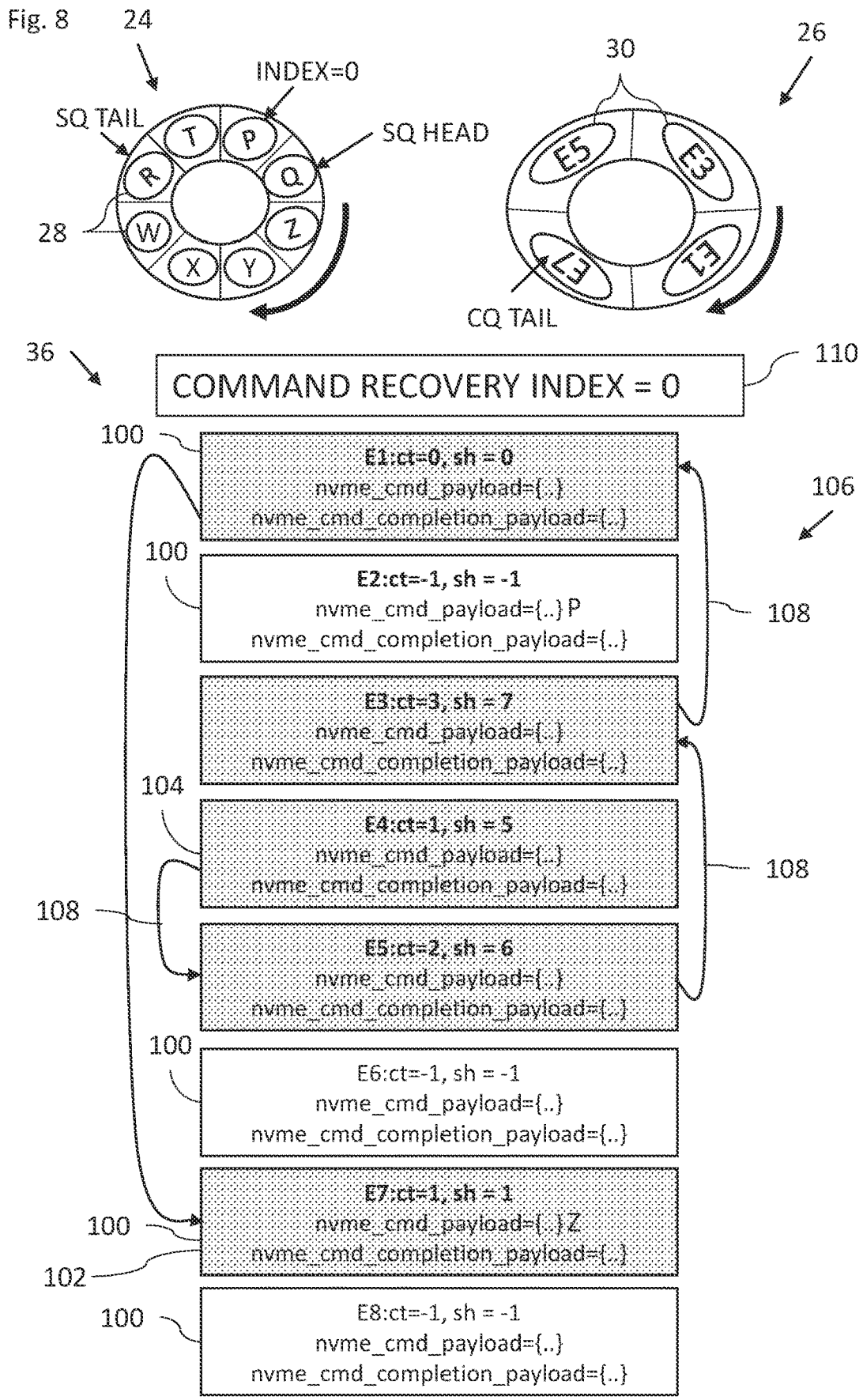
FIG. 8 is a block diagram view of queue and recovery data processing a new completion notice in the system of FIG. 1.
Figure 9:
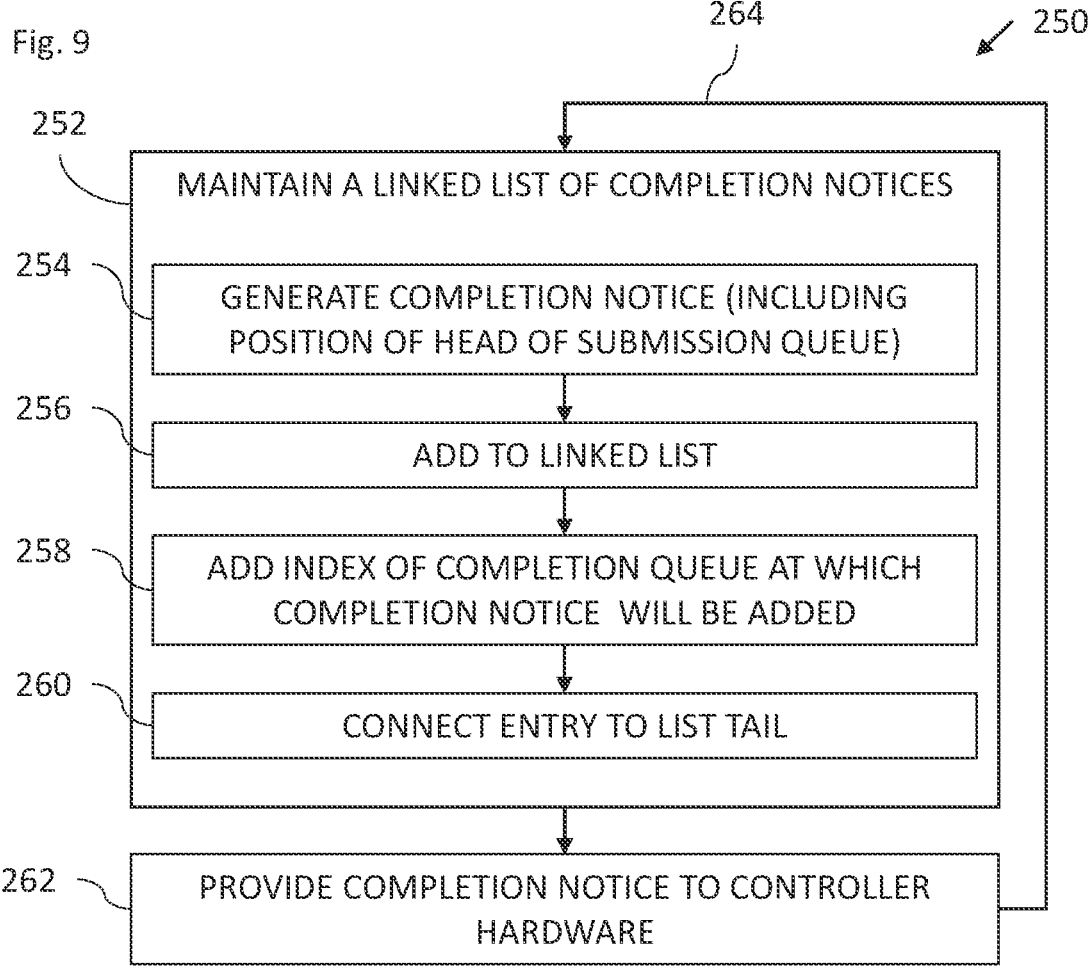
FIG. 9 is a flowchart including steps in a method for processing a new completion notice in the system of FIG. 1.

Reference is now made to FIGS. 8 and 9. FIG. 8 is a block diagram view of queues 24, 26 and recovery data 36 processing a new completion notice 30 in the system 10 of FIG. 1. FIG. 9 is a flowchart 250 including steps in a method for processing the new completion notice 30 in the system 10 of FIG. 1. Reference is also made to FIG. 1.

FIG. 8 shows that the command associated with entry E7 has been completed. The payload Z of the completion notice 30 for the command of entry E7 is added to entry E7 and that entry is added to the tail 102 of the linked list 106 and the completion notice 30 (which includes "sh"=1) is sent to the host. It should be noted that the tail 102 has moved from entry E1 to entry E7. The "ct" value (e.g., "ct"=1) is also added to entry E7 (but not to the completion notice 30) based on where the completion notice 30 will be added to CQ 26. The controller software 34 knows the "ct" value in which the completion notice 30 will be added to CQ 26 based on the size of the CQ and the fact that the index of the CQ 26 is advanced by 1 each time one of the completion notices 30 is added to the CQ 26.

In general, the controller software 34 is configured to maintain the linked list 106 of the completion notices 30 stored in the recovery data 36 ordered according to the order in which the completion notices 30 have been provided to the controller hardware 32 (block 252). The controller software 34 is configured, responsively to completion of a storage operation associated with a given command 28, to: generate the completion notice 30 for the completed storage operation associated with the given command 28 and include the current position of the head of the SQ 24 in the completion notice 30 (block 254); add the generated completion notice 30 to the linked list 106 to a given entry 100, which already includes the given command 28 (block 256); add to the recovery data 36 the index "ct" of the CQ 26 at which the generated completion notice 30 is, or will be, written by the controller hardware 32 to the CQ 26 (block 258); connect the given entry 100 including the generated completion notice 30 to the linked list 106 as the list tail 102 (block 260); and provide the completion notice 30 to the controller hardware 32 (block 262). The steps of blocks 252-262 are repeated for each new completion notice (arrow 264).

Figure 10:
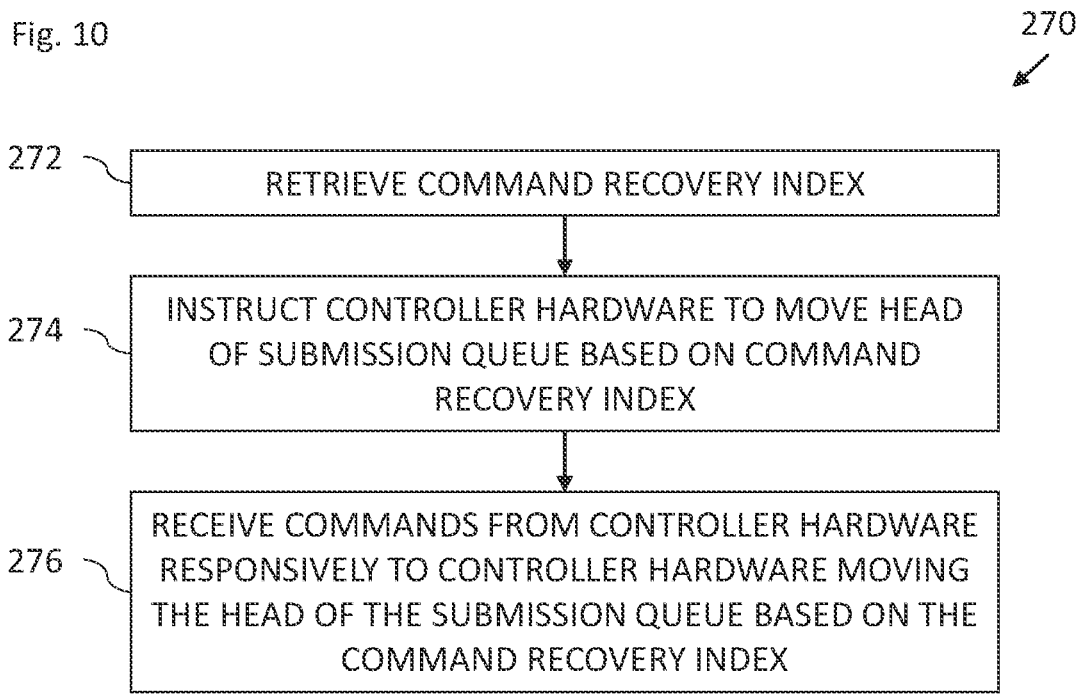
FIG. 10 is a flowchart including steps in a method to recover missing commands in the system of FIG. 1.

Reference is now made to FIG. 10, which is a flowchart 270 including steps in a method to recover missing commands 28 in the system 10 of FIG. 1. Reference is also made to FIG. 1. As mentioned above, the controller software 34 saves and updates the command recovery index 110 (FIG. 8) in the recovery data 36 in the persistent memory 20. The controller hardware 32 reads commands 28 from the SQ 24 and maintains its own record of the head position of the SQ 24 and updates the value of the head position of the SQ 24 as the controller hardware 32 reads commands 28 from the SQ 24. The controller hardware 32 also receives updates from the storage device driver 22 regarding the position of the tail of the SQ 24.

The following is an example of how commands are supplied to the controller hardware 32 and controller software 34 via the SQ 24. Assume that the position of the head of the SQ 24 "sq_head" and the position of the tail of the SQ 24 "sq_tail" are both equal to 0. The storage device driver 22 places a new command A in index 0 of the SQ 24 and informs the controller hardware 32 that sq_tail is equal to 1. The storage device driver 22 places a new command B in index 1 of the SQ 24 and informs the controller hardware 32 that sq_tail is equal to 2. The storage device driver 22 places a new command C in index 2 of the SQ 24 and informs the controller hardware 32 that sq_tail is equal to 3.

The controller hardware 32 reads command A from the SQ 24 and advances sq_head to 1. The controller hardware 32 sends command A to the controller software 34 (e.g., via the stateless pipe). The controller hardware 32 reads command B from the SQ 24 and advances sq_head to 2. The controller hardware 32 sends command B to the controller software 34 (e.g., via the stateless pipe). The controller hardware 32 reads command C from the SQ 24 and advances sq_head to 3. The controller hardware 32 sends command C to the controller software 34 (e.g., via the stateless pipe).

Now let us assume that command A arrived at the controller software 34, whereas commands B and C did not arrive at the controller software 34 prior to the controller software 34 crashing. The controller software 34 made a record that the command recovery index 110 is equal to 0 based on command A being read from sq_head=0. Therefore, during recovery the controller software 34 instructs the controller hardware 32 to set the sq_head to 1 (i.e. 1 plus the value of the command recovery index 110). The controller hardware 32 then sets sq_head to 1 and continues to read the SQ 24 from sq_head equal to 1 and resends commands B and C.

Therefore, responsively to a failure (e.g., the controller software 34 crashing), the controller software 34 is configured to retrieve the command recovery index 110 from the recovery data 36 in the persistent memory 20 (block 272). The controller software 34 is configured to instruct the controller hardware 32 to move the head of the SQ 24 based on the value (i.e., the command recovery index 110 or the command recovery index 110 plus 1 or any suitable value) stored in the recovery data 36 responsively to the failure. The controller hardware 32 is configured to update the position of the head of the SQ 24 and provide the missing command(s) 28 due to the failure responsively to moving the head of the SQ 24. The controller software 34 is configured to receive the missing command(s) 28 from the controller hardware 32 responsively to the controller hardware 32 moving the head of the SQ 24 based on the command recovery index 110.

Figure 11:
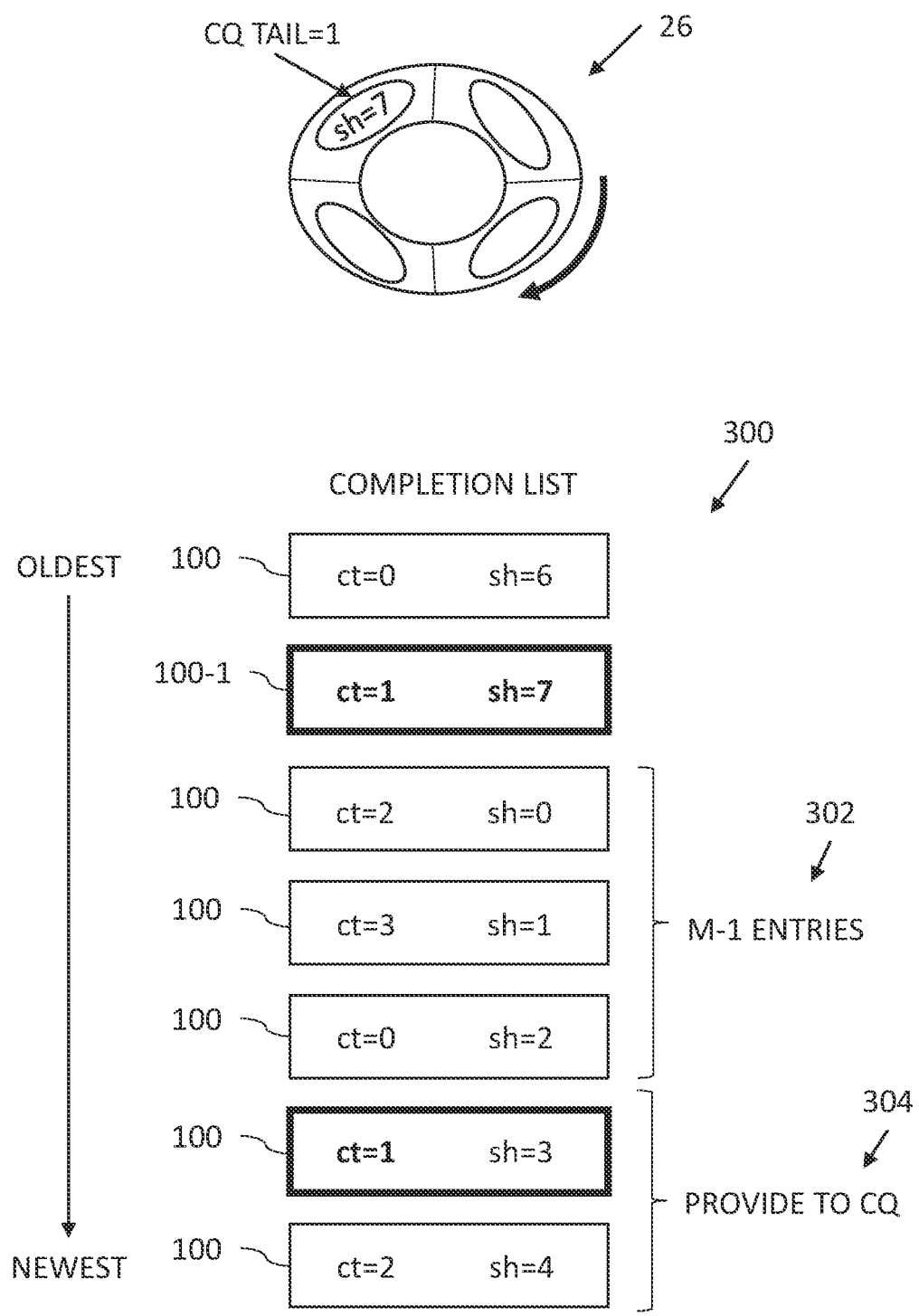
FIGS. 11-13 are views of a completion queue and a completion list illustrating recovery of missing completion notices in the system of FIG. 1.
Figure 12:
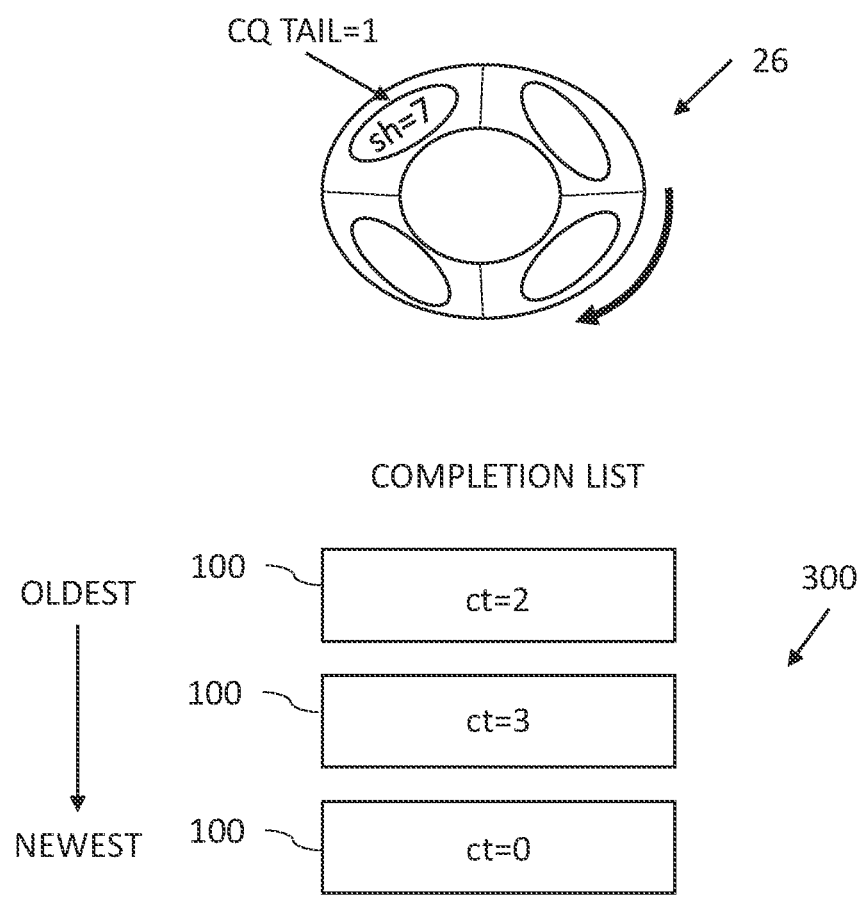
Figure 13:
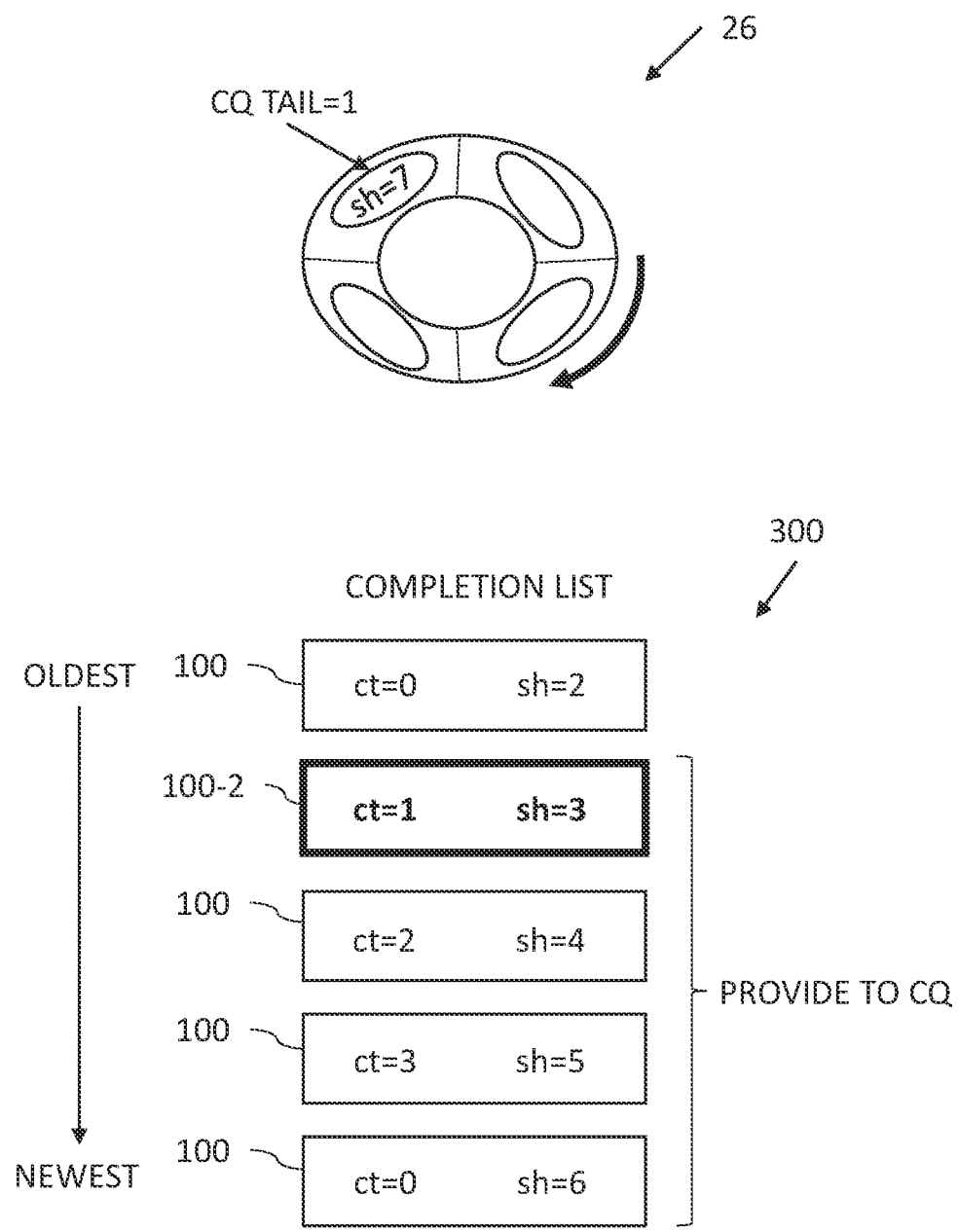

Reference is now made to FIGS. 11-13, which are views of the CQ 26 and a completion list 300 illustrating recovery of missing completion notices 30 in the system 10 of FIG. 1.

FIG. 11 shows that the tail of the CQ 26 includes an entry in which "sh" is equal to 7. The index of the tail of the CQ 26 is equal to 1. The completion list 300 includes two entries 100 (shown in bold) where "ct" is equal to 1. The first entry 100-1 where "ct" is equal to 1 also includes "sh" equal to 7. Therefore, it may be assumed that the completion notice 30 in entry 100-1 is the completion notice 30 already posted in the CQ 26. If there are M−1 entries 100 (arrow 302) after entry 100-1, where M is the size of the CQ 26, then the controller hardware 32 resends to the controller hardware 32 all the entries 100 (arrow 304) in the completion list 300 starting from the $M^{th}$ entry after entry 100-1, thereby recovering from lost completion notices 30 due to the failure.

If there is not an entry where "ct" is equal to 1 and "sh" is equal to 7 or there are not M−1 entries after entry 100-1, the controller software 34 is configured to look for the first entry in the completion list 300 where "ct" is equal to 1. If there are no such entries 100, as shown in FIG. 12, it may be assumed that all the completion notices 30 have been written by the controller hardware 32 to the controller software 34 and recovery from the failure is complete.

If there is an entry 100-2 in the completion list 300 where "ct" is equal to 1, as shown in FIG. 13 (the bolded entry 100-2), then it assumed that the completion notices 30 in the entries 100 starting from entry 100-2 have not been written to the CQ 26 and should therefore be resent by the controller hardware 32 to the controller hardware 32.

Figure 14:
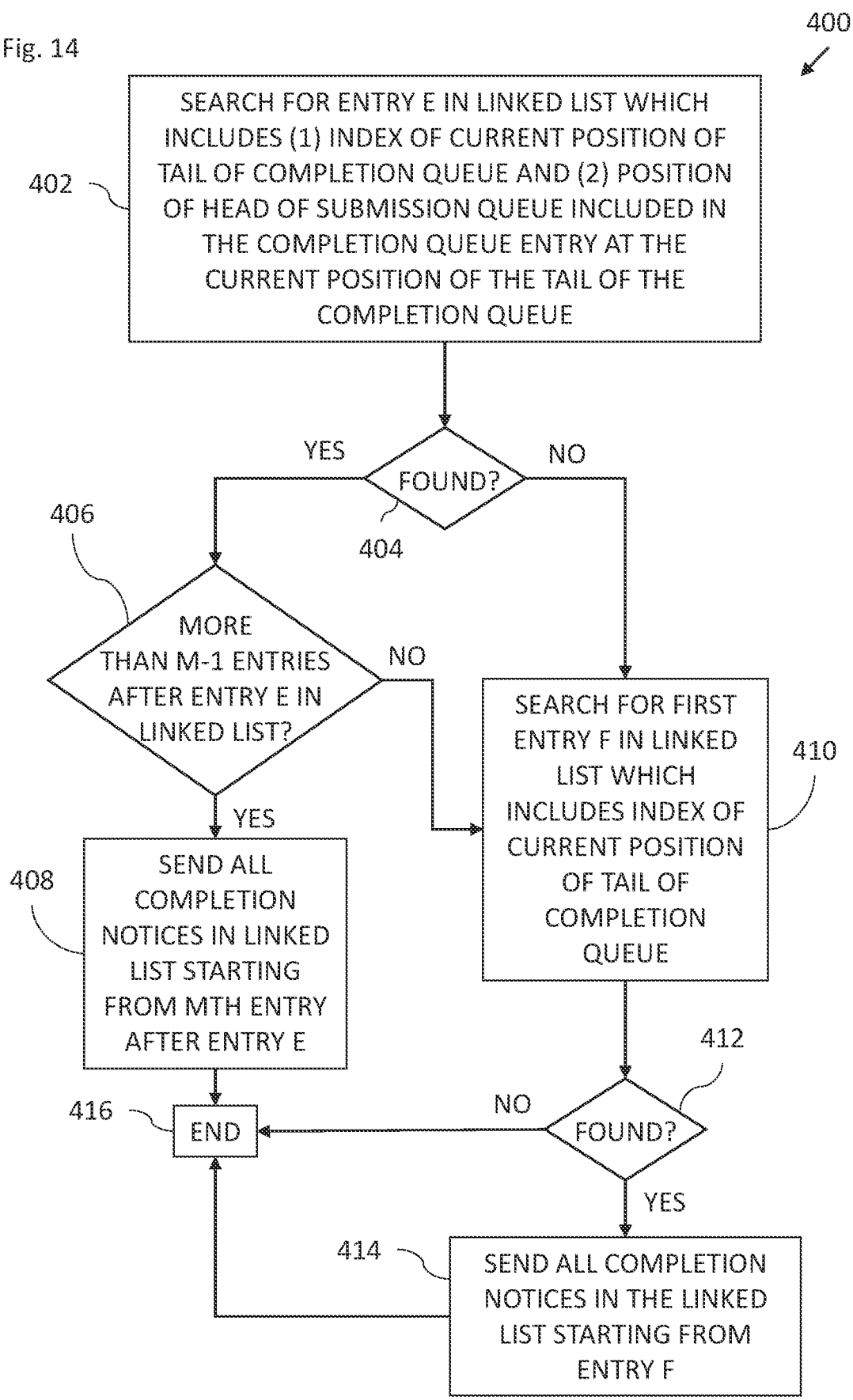
FIG. 14 is a flowchart including steps in a method to recover missing completion notices in the system of FIG. 1.

Reference is now made to FIG. 14, which is a flowchart 400 including steps in a method to recover missing completion notices 30 in the system of FIG. 1. In response to the failure, the controller software 34 is configured to search in the linked list 106 (e.g., the completion list 300) for a given entry E including: (1) an index "ct" of a current position of a tail of the CQ 26; and (2) a submission queue head position "sh" equal to a position of the head of the SQ 24 included in an entry of the CQ 26 at the current position of the tail of the CQ 26 (block 402). At a decision block 404 it is determined if the entry E was found. If the entry E was found, the controller software 34 is configured to search for M−1 (or more) entries 100 in the linked list 106 after the given entry E (decision block 406), and in response to finding the given entry E and M−1 (or more) entries 100, the controller software 34 is configured to provide to the controller hardware 32 (all) the completion notices 32 that are in the linked list 106 according to an order of the linked list 106 starting from the $M^{th}$ entry after the given entry E in the linked list 106 (block 408).

In response to not finding the given entry E (at decision block 404), or not finding the M−1 (or more) entries at decision block 406, the controller software 34 is configured to search in the linked list 106 for a first given entry F including the index "ct" of the current position of the tail of the CQ 26 (block 410). At a decision block 412, the controller software 34 determines if the entry F was found. In response to finding the given entry F (i.e., in response to finding the index "ct" of the current position of the tail in the linked list 106 at the given entry F), the controller software 34 is configured to provide to the controller hardware 32 (all) the completion notices 30 that are in the linked list 106, according to an order of the linked list 106, starting from the entry 100-2 (i.e., entry F) including the found index "ct" (block 414). In response to not finding the index "ct" of the current position of the tail in the linked list 106, determine that all the completion notices 30 were written to the CQ 26 by the controller hardware 32 (block 416).

In practice, some or all of the functions of the controller software 34 may be combined in a single physical component or, alternatively, implemented using multiple physical components. These physical components may comprise hard-wired or programmable devices, or a combination of the two. In some embodiments, at least some of the functions of the controller software 34 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising a storage device controller, the storage device controller including:
a first controller to:
read commands from a submission queue stored in a shared memory;
provide the commands to a second controller; and
write completion notices received from the second controller to a completion queue in the shared memory; and
the second controller to:
receive the commands from the first controller;
perform storage operations with a non-volatile memory responsively to receiving the commands;
generate the completion notices responsively to performing the storage operations,
provide the completion notices to the first controller;
write recovery data about the commands and the completion notices to a persistent memory; and
recover from a failure responsively to retrieving the recovery data from the persistent memory.

2. The system according to claim 1, wherein the first controller is a hardware controller, and the second controller is a software controller.

3. The system according to claim 2, wherein the controller software is to:
cause the controller hardware to provide any of the commands already retrieved by the controller hardware but not yet written to the recovery data; and
send any of the completion notices comprised in the recovery data but not yet written to the completion queue.

4. The system according to claim 2, further comprising a host device to execute a storage device driver to:
write the commands to the submission queue; and
read the completion notices from the completion queue.

5. The system according to claim 4, wherein the submission queue and the completion queue are cyclic queues.

6. The system according to claim 2, wherein the controller software is to:
write copies of the commands to the recovery data; and
write copies of the completion notices to the recovery data.

7. The system according to claim 6, wherein:
the controller software is to write a value to the recovery data based on an index in the submission queue from where a latest command of the commands was provided by the controller hardware;
the controller software is to instruct the controller hardware to move a head of the submission queue based on the value stored in the recovery data responsively to the failure; and
the controller hardware is to provide at least one missing one of the commands due to the failure responsively to moving the head of the submission queue.

8. The system according to claim 6, wherein the controller software is to maintain a linked list of ones of the completion notices stored in the recovery data ordered according to the order in which the completion notices have been provided to the controller hardware, the linked list having a list head and a list tail.

9. The system according to claim 8, wherein the controller software is, responsively to completion of a storage operation associated with a given command of the commands, to:
generate a completion notice;
add the generated completion notice to the linked list;
connect an entry including the generated completion notice to the linked list as the list tail; and
provide the completion notice to the controller hardware.

10. The system according to claim 9, wherein the controller software is to generate the completion notices to include respective positions of a head of the submission queue.

11. The system according to claim 10, wherein the controller software is to add to the recovery data respective indices of the completion queue at which respective ones of the completion notices are, or will be, written by the controller hardware to the completion queue.

12. The system according to claim 11, wherein, in response to the failure, the controller software is to:
search in the linked list for an index of a current position of a tail of the completion queue; and
in response to not finding the index of the current position of the tail in the linked list, determine that all the completion notices were written to the completion queue by the controller hardware.

13. The system according to claim 11, wherein, in response to the failure, the controller software is to:
search in the linked list for an index of a current position of a tail of the completion queue; and
in response to finding the index of the current position of the tail in the linked list, provide to the controller hardware the completion notices that are in the linked list, according to an order of the linked list, starting from an entry of the linked list including the found index.

14. The system according to claim 11, wherein, in response to the failure, the controller software is to:
search in the linked list for a given entry E including: (1) an index of a current position of a tail of the completion queue; and (2) a submission queue head position equal to a position of the head of the submission queue included in an entry of the completion queue at the current position of the tail of the completion queue;
search for at least M−1 entries in the linked list after the given entry E, wherein M is a size of the completion queue; and
in response to finding the given entry E and the at least M−1 entries, provide to the controller hardware the completion notices that are in the linked list according to an order of the linked list starting from an $M^{th}$ entry after the given entry E in the linked list.

15. The system according to claim 11, wherein, in response to the failure, the controller software is to:
search in the linked list for a given entry E including: (1) an index of a current position of a tail of the completion queue; and (2) a submission queue head position equal to a position of the head of the submission queue included in an entry of the completion queue at the current position of the tail of the completion queue;

search for at least M−1 entries in the linked list after the given entry E, wherein M is a size of the completion queue;

in response to not finding the at least M−1 entries, search in the linked list for a given entry F including the current position of the tail of the completion queue; and in response to finding the given entry F, provide to the controller hardware the completion notices according to an order of the linked list that are in the linked list starting from the given entry F in the linked list.

16. The system according to claim 11, wherein, in response to the failure, the controller software is to:

search in the linked list for a given entry E including: (1) an index of a current position of a tail of the completion queue; and (2) a submission queue head position equal to a position of the head of the submission queue included in an entry of the completion queue at the current position of the tail of the completion queue;

in response to not finding the given entry E, search in the linked list for a given entry F including the current position of the tail of the completion queue; and in response to finding the given entry F, provide to the controller hardware the completion notices according to an order of the linked list that are in the linked list starting from the given entry F in the linked list.

17. The system according to claim 8, wherein:

the recovery data includes a plurality of entries;

some of the entries include respective ones of the commands without corresponding completion notices;

some of the entries include respective ones of the commands with corresponding completion notices; and the controller software, responsively to completion of a storage operation associated with a given command of the commands, is to:

generate a completion notice;

add the generated completion notice to a given entry of the entries including the given command;

connect the given entry to the linked list as the list tail; and provide the completion notice to the controller hardware.

18. The system according to claim 17, wherein the controller software is to:

add a latest command of the commands received from the controller hardware to one of the entries at the list head of the linked list; and disconnect the entry of the latest command from the linked list.

19. A method, comprising:

reading commands from a submission queue stored in a shared memory;

providing the commands to a first controller;

writing completion notices received from the first controller to a completion queue in the shared memory;

receiving the commands from a second controller;

performing storage operations with a non-volatile memory responsively to receiving the commands;

generating the completion notices responsively to performing the storage operations;

providing the completion notices to the second controller;

writing recovery data about the commands and the completion notices to a persistent memory; and recovering from a failure responsively to retrieving the recovery data from the persistent memory.

* * * * *